United States Patent

[11] 3,599,500

[72] Inventor Ben Bravin
       215 W. 88th St., New York, N.Y. 10024
[21] Appl. No. 836,282
[22] Filed June 25, 1969
[45] Patented Aug. 17, 1971

[54] ZERO BACKLASH, LOW-FRICTION LINEAR-ROTARY TRANSLATOR
7 Claims, 4 Drawing Figs.

[52] U.S. Cl. .................................... 74/89.15, 74/424.8
[51] Int. Cl. .................................... F16h 27/02, F16h 1/8
[50] Field of Search .......................... 74/89.15, 216.5, 424.8, 440

[56] References Cited
UNITED STATES PATENTS
2,865,211  12/1958  Doyle .......................... 74/89.15
2,883,183  4/1959   Finsterwalder et al. ...... 74/89.15
3,133,453  5/1964   La Pointe ..................... 74/424.8
3,393,754  7/1968   Hachemeister ............... 74/216.5

FOREIGN PATENTS
283,590  3/1931  Italy ............................ 74/216.5

Primary Examiner—William F. O'Dea
Assistant Examiner—Wesley S. Ratliff, Jr.
Attorney—Sandoe, Hopgood and Calimafde ABSTRACT: A linearly movable actuator contacts with flat faces on opposite sides of a shaft. The faces extend helically along the shaft. Axial movement of the actuator along the shaft causes the shaft to rotate, and the actuator can be adjusted into canted positions so that it contacts with the opposite sides of the shaft at the same time, thereby eliminating backlash from the system.

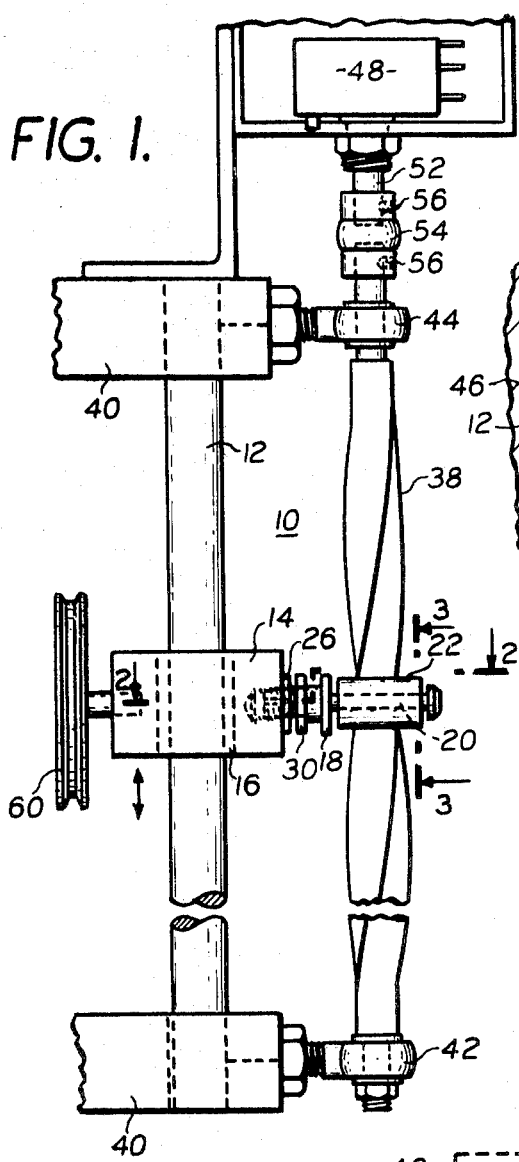
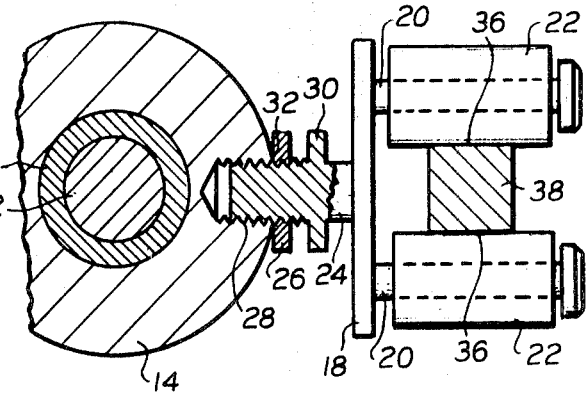
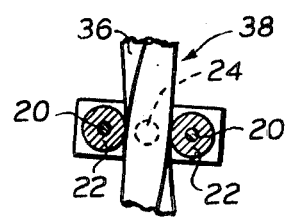
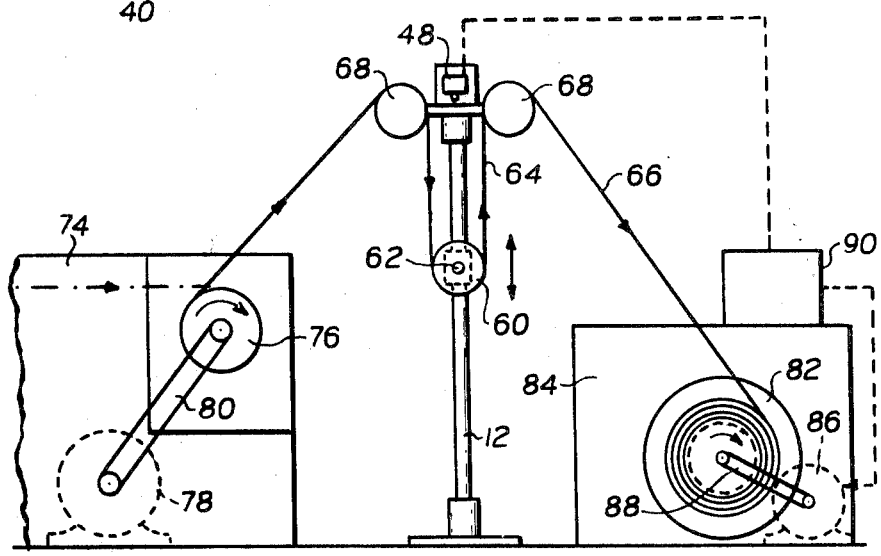

ZERO BACKLASH, LOW-FRICTION LINEAR-ROTARY TRANSLATOR

BACKGROUND AND SUMMARY OF THE INVENTION

In motion-transmission systems for converting linear motion to rotary motion, the linearly movable element usually has reciprocating movement. If there is any backlash in the system, the relative positions of the linear element and a follower having rotary motion are different when the linear element is moving in different directions.

This invention is a linear-rotary translator system which has zero backlash so that corresponding positions of parts of the system are unaffected by the direction of movement.

The linearly movable element is an actuator which contacts with a helical face on a shaft so that the actuator turns the shaft about its axis as the actuator moves up and down along the helical face of the shaft. In the preferred construction, the linearly movable element contacts simultaneously with faces on opposite sides of the shaft. Both faces are similar and helical and the actuator is adjustable to maintain simultaneous contact with both faces.

The invention will be described as applied to a machine in which wire is wrapped on a takeup spool as the wire comes from wire-drawing apparatus; and the speed of a motor that turns the spool is controlled by the movement of a "dancer roll" which moves back and forth in response to errors in the synchronization of the two machines. Reciprocating movement of the dancer roll moves an actuator which rotates a shaft to operate a motor speed controller, such as a potentiometer, that changes the speed of the takeup spool.

It will be understood that this use of the invention represents only one combination of structure in which the linear-rotary translator of this invention can be used.

In order to keep the friction low, antifriction elements such as rollers, are used on the actuator to transmit motion of the actuator to the shaft. Backlash is reduced to zero by canting the actuator to bring the centerline between the different rollers into transverse angular positions that cause both rollers to touch the shaft simultaneously and with as little pressure as is necessary for the zero backlash.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a side elevation of a linear-rotary translator system made in accordance with this invention;

FIG. 2 is an enlarged sectional view taken on the line 2–2 of FIG. 1;

FIG. 3 is a sectional view taken on the line 3–3 of FIG. 1; and

FIG. 4 is a diagrammatic view of wire-drawing apparatus having a loop in the wire and a dancer roll in contact with the loop for operating a takeup spool motor speed controller through the linear-rotary translator system of this invention.

DESCRIPTION OF PREFERRED EMBODIMENT

The linear-rotary translator system of this invention includes an actuator 10 which moves linearly along a guide post 12. The actuator 10 includes a body portion 14 in which there is inserted a bushing 16 to provide a bearing for the actuator on the post 12. This bearing is long enough so that the actuator 10 slides freely on the post even though the force for moving it is applied at some distance from the axis of the post 12.

The actuator 10 includes also a frame 18 having two spaced axles 20 extending from it in a direction away from the body portion 14. There is an antifriction roller 22 on each of the axles 20. These rollers turn freely on the axles 20.

The axles 20 are fixed studs extending from the frame 18 and there is another fixed stud 24 extending from the frame 18 on the opposite side of the frame from the axles 20. The axis of the stud 24 is located midway between the axes of the axles 20.

The stud 24 is threaded and screws into a threaded opening 28 in the body portion 14 of the actuator 10. There is a lock nut 26 on the threads of the stud 24. A hexagonal flange 30 of the stud 24 permits the stud to be gripped by a wrench for rotating it. Tightening the nut 26 grips the stud 24 so that the stud can be held in a fixed position with respect to the body portion 14 of the actuator. This construction may be considered representative of means for adjusting the frame 18 with respect to the body portion 14 of the actuator, and more specifically means for holding the frame 18 in a selected adjustment.

The rollers 22 of the actuator 10 contact with helical faces 36 on opposite sides of a shaft 38. In the construction illustrated, the shaft 38 is made of square stock of uniform cross section and the shaft is twisted to give the side faces of the shaft a uniform helical pitch. The shaft 38 can be made from a square, rectangular, of flat shape.

When a nonlinear translation function is required, a corresponding nonuniform pitch can be used on shaft 38. In such case, in order to eliminate backlash the assembly carrying rollers 22 has to be spring loaded and freely pivoting about the axis of stud 24 rather than being locked in a fixed position.

The distance between the circumferences of rollers 22 is slightly greater than the distance between the faces 36 on opposite sides of the shaft 38. Referring to FIG. 3, it will be apparent that the rollers 22 can be moved toward or away from the faces 36 by turning the frame 18 angularly about the axis of the stud 24. Thus in FIG. 3 counterclockwise rotation of the frame 18 about the axis of the stud 24 will remove the rollers 22 further apart in a direction normal to the longitudinal axis of the shaft 38. Conversely, rotation of the frame 18 clockwise in FIG. 3 causes both rollers 22 to contact with the opposite faces 36 of the shaft 38 and the pressure of the rollers 22 against the faces 36 of the shaft 38 can be controlled by the amount of force used to turn the frame 18 clockwise.

Backlash in the linear-rotary translator of this invention is reduced to zero by adjusting the frame 18 so that both rollers 22 contact simultaneously and with some pressure against the faces 36 on opposite sides of the shaft 38. In order to adjust the frame 18, the lock nut 26 is loosened to permit the stud 24 to rotate; and this rotation cants the frame 18 with respect to the actuator 10 to bring the rollers 22 against the faces of the shaft 38. While the rollers 22 are pressed against the shaft 38 with a desired pressure, the nut 26 is tightened to hold the frame 18 in its adjusted position, or the frame 18 can be given a spring bias toward canted position, as previously explained.

The opposite ends of the post 12 extend into stationary supports 40 and the shaft 38 turns in bearings 42 and 44 which are carried by the supports 40 or any other stationary structure which will hold these bearings 42 and 44 in a substantially fixed relation with respect to the post 12. One of the bearings 42 or 44, and preferably the bearing 42, is locked axially to take the thrust on the shaft 38, and the shaft 38 has cylindrical portions which project through these bearings 42 and 44. The bearings 42 and 44 are preferably self-aligning ball bearings and they support the shaft 36 with its axis substantially parallel to the axis of the post 12.

The shaft 38 can be used for rotating any desired apparatus which is to move in response to linear displacement of the actuator 10. In the system illustrated, there is a motor speed controller, and specifically a potentiometer 48 carried by a bracket 50 extending from the fixed support 40. The potentiometer 48 has an operating shaft 52 which is connected with the upper end of the shaft 38 by a self-aligning coupling 54.

The coupling 54 has its opposite ends connected to the shafts 38 and 52 by rigid connections such as setscrews 56 and the coupling is capable of some axial and angular misalignment but is free of play which could introduce backlash in the connection of the shaft 38 to the shaft 52.

The actuator 10 can be moved up and down along the post 12 in various ways. FIG. 4 shows the body portion 14 of the actuator connected with a dancer roll 60 rotatable on an axle 62 extending from the actuator 10 and constituting a unitary part of the actuator so that all movement of the dancer roll 60 in a direction parallel to the axis of the post 12 is transmitted, without lost motion, to the actuator.

The dancer roll 60 contacts with a loop 64 along the path of a wire 66. This loop is formed between guide rolls 68, and the wire tension results from the weight of the dancer roll 60, and when necessary additional loading such as a spring, weight, chain or pneumatic cylinder.

The wire 66 comes from a wire-drawing apparatus 74 which is indicated diagrammatically in FIG. 4. A wire-pulling drum 76 is driven from a motor 78 through motion-transmitting connections 80.

The wire 66 is wound on a takeup spool 82 of takeup apparatus 84; and the takeup spool 82 is driven by a motor 86 through motion-transmitting connections 88.

The speed at which the spool 82 is driven depends upon the speed at which the wire comes from the wire-drawing apparatus and upon the diameter of the reel of wire already wrapped on the spool 82 at any particular time. As this diameter increases, the rotary speed of the spool 82 must decrease.

The speed of the motor 86 and the corresponding speed of the spool 82 are controlled by adjusting the motor speed to maintain the speed of the wire 66 substantially constant. This is done by providing a motor control 90 which regulates the amount of electric power supplied to the motor 86; and the control 90 is, in turn, regulated by the potentiometer 48 which is turned one way or the other in accordance with movement of the actuator 10 up and down along the post 12.

As speed in the wire 66 increases, the loop 64 moves the dancer roll 60 upward and this imparts an upward movement to the actuator 10 which is translated into rotary movement of the potentiometer 48 in a direction to operate the control to reduce the speed of the motor 86 with resulting decrease in the speed of the wire. Conversely, a reduction in the speed of the wire causes the dancer roll 60 to accumulate more slack in the loop 64 and the resulting downward movement of the dancer roll results in an increase in the speed of the motor 86.

The apparatus shown in FIG. 4 is representative of other equipment where control is effected by a rotary adjustment in response to linear movement of another part. It is also used for signal generators in servo mechanisms where the desired response must coincide with the position of the actuator along its stroke regardless of whether the actuator is moving in a forward or rearward direction at the time. Such response is made possible by having the linear rotary translator free of backlash.

The preferred embodiment of the invention has been illustrated and described and the invention is defined in the appended claims.

I claim:

1. A linear-rotary translator system comprising an actuator mounted for movement along an axis of translation, a shaft mounted for rotation about an axis extending generally parallel to said axis of translation, a face on the shaft extending in a generally helical direction along the shaft, a surface of the actuator that contacts with the face of the shaft for imparting rotary movement to the shaft in response to linear movement of the actuator along its axis of translation, means holding the actuator in constant contact with the helical face of the shaft to prevent backlash in the translator system, a guide post generally parallel to the shaft, the actuator being located on the guide post and the axis of the guide post being an axis of translation of the actuator, the guide post being of round cross section and the shaft being of noncircular and uniform cross section and twisted to provide the helical face, the shaft having cylinder portions near its opposite ends, and bearings in which the cylinder portions of the shaft are rotatable.

2. The linear-rotary translator system described in claim 1 characterized by similar faces on opposite sides of the shaft extending in generally helical directions along the shaft, and two surfaces of the actuator, each of which surfaces contacts with a different one of the helical faces of the shaft, the means holding the actuator in constant contact including apparatus that maintains said two surfaces spaced from one another by the spacing of the helical faces, the actuator having a body portion that moves on the guide as a bearing, a frame that carries the surfaces of the actuator which contact with the helical faces, and said means for holding the actuator in constant contact including connecting means that secure the frame to the body portion, said connecting means being adjustable to change the position of the frame with respect to the body portion and thereby change the spacing of said two surfaces transverse of the shaft.

3. The linear-rotary translator system described in claim 2 characterized by said two surfaces of the actuator that contact with the helical faces being rollers for reducing the friction of the system, and the connecting means including a stud extending from the body portion of the actuator along an axis parallel to the axes of the rollers and midway between said axes, the frame that carries the rollers and on which the rollers rotate being angularly movable about the axis of the stud to selectively swing both rollers toward or away from the faces of the shaft, and a clamping element that locks the frame in any adjusted position, said rollers having limited axial movement on their axles and the axles being spaced so that the distance between the circumferences of the rollers is slightly more than the distance between the faces of the shaft measured in a direction normal to the longitudinal axis of the shaft.

4. A linear-rotary translator system comprising an actuator mounted for movement along an axis of translation, a shaft mounted for rotation about an axis extending generally parallel to said axis of translation, a face on the shaft extending in a generally helical direction along the shaft, a surface of the actuator that contacts with the face of the shaft for imparting rotary movement to the shaft in response to linear movement of the actuator along its axis of translation, means holding the actuator in constant contact with the helical face of the shaft to prevent backlash in the translator system, characterized by self-aligning bearings in which the shaft turns, including a thrust bearing for holding the shaft against axial movement, stationary supports for the bearings, rotary apparatus at a fixed location beyond one end of the shaft and in substantial alignment with the shaft, and a self-aligning coupling connecting the shaft with the rotary apparatus.

5. The linear-rotary translator system described in claim claim 4 characterized by an electric motor, means driven by the motor, the rotary apparatus being a speed control for the motor and for the means driven by the motor, and the actuator being responsive to the movement of said means driven by the motor.

6. A linear-rotary translator system comprising an actuator mounted for movement along an axis of translation, a shaft mounted for rotation about an axis extending generally parallel to said axis of translation, a face of the shaft extending in a generally helical direction along the shaft, a surface of the actuator that contacts with the face of the shaft for imparting rotary movement to the shaft in response to linear movement of the actuator along its axis of translation, means holding the actuator in constant contact with the helical face of the shaft to prevent backlash in the translator system, characterized by a motor, mechanism operated by the motor, the actuator being located in position to be responsive to movement of said mechanism, a motor speed control, motion-transmitting connections by which the rotation of the shaft operates the motor speed control, a dancer roll that rolls on a deflected part of an elongated workpiece and that moves with respect to changes in the deflection resulting from changes in tension or speed of the workpiece, the dancer roll being connected with the actuator and the actuator being movable as a unit with the dancer roll.

7. The linear-rotary translator system described in claim 6 characterized by the elongated workpiece being a wire, apparatus that operates on the wire and from which the wire is delivered with continuous motion, wire-winding apparatus including a takeup spool on which the wire is wound, and a motor that drives the takeup spool, guides over which the wire passes on its way to the takeup spool, the dancer roll deflecting the wire between the guides into a loop, means urging the dancer roll to move in a direction to increase the length of wire in the loop, the motor that drives the spool being the motor which has said motor speed control, and the motor speed control being the motor which has said motor speed control, and the motor speed control being oriented so that movement of the dancer roll in response to wire speed that reduces the length of the loop, operates the motor speed control to reduce the motor speed, and movement of the dancer roll in the opposite direction operates the control to increase the motor speed.